United States Patent
Matsumoto

(10) Patent No.: US 7,630,045 B2
(45) Date of Patent: Dec. 8, 2009

(54) LIQUID CRYSTAL DISPLAY, METHOD FOR PRODUCING LIQUID CRYSTAL DISPLAY, AND ELECTRONIC APPARATUS

(75) Inventor: Tomotaka Matsumoto, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 245 days.

(21) Appl. No.: 11/944,117

(22) Filed: Nov. 21, 2007

(65) Prior Publication Data
US 2008/0180613 A1    Jul. 31, 2008

(30) Foreign Application Priority Data
Jan. 25, 2007    (JP) ............................. 2007-014900

(51) Int. Cl.
*G02F 1/1335* (2006.01)
*G02F 1/1343* (2006.01)
*G02F 1/137* (2006.01)

(52) U.S. Cl. ...................... 349/141; 349/114; 349/187

(58) Field of Classification Search ............... 349/42, 349/43, 113, 114, 122, 138, 139, 141, 187; 257/59, 72; 345/87, 92; 438/30
See application file for complete search history.

(56) References Cited

U.S. PATENT DOCUMENTS

| 7,088,409 B2 * | 8/2006 | Itou et al. ................. 349/114 |
| 7,486,351 B2 * | 2/2009 | Itou et al. ................. 349/99 |
| 2007/0146591 A1 * | 6/2007 | Kimura et al. ............. 349/114 |
| 2007/0242204 A1 * | 10/2007 | Fujita et al. ............... 349/141 |
| 2008/0007679 A1 * | 1/2008 | Ochiai et al. .............. 349/114 |

FOREIGN PATENT DOCUMENTS

JP    A 2005-338256    12/2005

\* cited by examiner

*Primary Examiner*—Dung Nguyen
*Assistant Examiner*—Tai Duong
(74) *Attorney, Agent, or Firm*—Oliff & Berridge, PLC

(57) ABSTRACT

A liquid crystal display includes a pair of substrates, a liquid crystal layer being held by the pair of substrates, a first electrode and a second electrode that drive the liquid crystal layer, and a driving element that controls the driving of the first electrode, the first electrode, the second electrode, and the driving element being disposed on one of the pair of substrates. The one of the pair of substrates includes a resin film, an overlying film disposed on the resin film, the first electrode being disposed on the top surface of the overlying film, an electrode insulating film covering the first electrode, the second electrode being disposed on the top surface of the electrode insulating film, a connection electrode disposed on the electrode insulating film and connecting the first electrode to the driving element, and a connection line disposed below the overlying film and connected to the second electrode. The connection electrode is connected to the first electrode through a first through hole passing through the electrode insulating film and is connected to the driving element through a second through hole passing through the overlying film and the electrode insulating film. The second electrode is connected to the connection line through a third through hole passing through the overlying film and the electrode insulating film.

13 Claims, 9 Drawing Sheets

LIQUID CRYSTAL DISPLAY, METHOD FOR PRODUCING LIQUID CRYSTAL DISPLAY, AND ELECTRONIC APPARATUS

BACKGROUND

1. Technical Field

The present invention relates to a liquid crystal display, a method for producing a liquid crystal display, and an electronic apparatus.

2. Related Art

To achieve a wider viewing angle of a liquid crystal display, the use of a mode of controlling the alignment of liquid crystal molecules by generating an electric field in a direction parallel to a substrate and applying the electric field to a liquid crystal layer (hereinafter, referred to as a "lateral electric field mode") has been known. Known examples of such a lateral electric field mode include an in-plane switching (IPS) mode and a fringe-field switching (FFS) mode (for example, see JP A 2005-338256).

In a liquid crystal display operating in such a lateral electric field mode, a pixel electrode and a common electrode, which are a pair of electrodes for driving liquid crystal molecules, are arranged on one of a pair of substrates holding a liquid crystal layer with an electrode insulating film provided therebetween. In general, one electrode arranged below the electrode insulating film is disposed on a resin film such as an acrylic resin film. In a transflective liquid crystal display, a reflective film composed of aluminum (Al) is arranged on the resin film and the one electrode is arranged on the reflective film and the resin film.

To suppress the effect of the electric field between adjoining pixel regions, in some cases, a pixel electrode connected to a driving element such as a TFT element is disposed further apart from the liquid crystal layer than the common electrode. This is because if the pixel electrode is located closer to the liquid crystal layer side than the common electrode, an electric filed generated in a pixel region expands to adjacent pixel regions through the liquid crystal layer to affect peripheries of adjacent pixel regions.

JP A 2005-338256 is an example of related art.

However, the above-described known liquid crystal display has the following problems. That is, in the known liquid crystal display the one electrode is disposed on the resin film composed of acrylic, which is an organic oxide. To inhibit damage from an oxygen-containing gas to the resin film, the electrode insulating film is preferably composed of silicon nitride (SiN), which is a material that does not require a large amount of an oxygen-containing gas. However, the use of the electrode insulating film composed of SiN causes image sticking because SiN has electronic defect levels (traps) and a large charge-storing effect. Thus, formation of an additional insulating film composed of SiN on the resin film and an electrode insulating film composed of $SiO_2$ having a small number of defect levels has been proposed. In this case, to connect the pixel electrode with the driving element, a through hole passing through the additional insulating film needs to be formed. Therefore, a step of forming the through hole passing through only the additional insulating film is separately required in addition to a step of forming the additional insulating film. This disadvantageously results in a complex production process.

In the case where the one electrode is formed on the reflective film composed of Al, an ITO film constituting the one electrode is formed so as to cover the reflective film, and is then patterned. However, a contact potential is generated between ITO and Al; hence, Al is etched when being immersed in an electrolytic solution. Thus, it is proposed that an additional insulating film is formed so as to cover the reflective film to insulate the reflective film from the one electrode. However, a through hole passing through the additional insulating film needs to be formed in order to connect the pixel electrode to the driving element in the same way as described above. Therefore, a step of forming the through hole passing through only the additional insulating film is separately required in addition to a step of forming the additional insulating film. This disadvantageously results in a complex production process.

SUMMARY

An advantage of some aspects of the invention is that it provides a liquid crystal display, a method for producing a liquid crystal display, and an electronic apparatus, the method being performed by simple steps without an increase in the number of steps of forming a through hole even when an insulating film is formed between a resin film and a pixel electrode.

To overcome the above-described problems, the invention provides a liquid crystal display including a pair of substrates, a liquid crystal layer being held by the pair of substrates, a first electrode and a second elect-rode that drive the liquid crystal layer, and a driving element that controls the driving of the first electrode, the first electrode, the second electrode, and the driving element being disposed on one of the pair of substrates. The one of the pair of substrates includes a resin film, an overlying film disposed on the resin film, the first electrode being disposed on the top surface of the overlying film, an electrode insulating film covering the first electrode, the second electrode being disposed on the top surface of the electrode insulating film, a connection electrode disposed on the electrode insulating film and connecting the first electrode to the driving element, and a connection line disposed below the overlying film and connected to the second electrode. The connection electrode is connected to the first electrode through a first through hole passing through the electrode insulating film and is connected to the driving element through a second through hole passing through the overlying film and the electrode insulating film. The second electrode is connected to the connection line through a third through hole passing through the overlying film and the electrode insulating film.

A method according to an embodiment of the invention for producing a liquid crystal display including a pair of substrates, a liquid crystal layer being held by the pair of substrates, a first electrode and a second electrode that drive the liquid crystal layer, and a driving element that controls the driving of the first electrode, the first electrode, the second electrode, and the driving element being disposed on one of the pair of substrates includes forming a connection line on the one of the pair of substrates, the connection line being connected to the second electrode, forming a resin film above the connection line, forming an overlying film on the resin film, forming the first electrode on the overlying film, forming an electrode insulating film on the overlying film in such a manner that the electrode insulating film covers the first electrode, forming a first through hole, a second through hole, and a third through hole, the first through hole passing through the electrode insulating film, and the second and the third through holes passing through the electrode insulating film and the overlying film, and forming a connection electrode and the second electrode, the connection electrode being connected to the first electrode through the first through hole and being connected to the driving element through the second through hole, and the second electrode being connected to the connection line through the third through hole.

In this case, the first and second through holes are formed simultaneously with the third through hole used for the connection between the second electrode and the connection line, and the first electrode is connected to the driving element with the connection electrode. Hence, there is no need to form a through hole in the overlying film, thereby inhibiting a significant increase in the complexity of the production process. That is, to connect the connection line with the second electrode disposed in each pixel region, it is necessary to form the third through hole at least passing through the overlying film and the electrode insulating film. The first electrode is not directly connected to the driving element. The first electrode is connected to the driving element with the connection electrode disposed on the electrode insulating film. The connection electrode can be formed simultaneously with the formation of the second electrode. The first through hole passing through only the electrode insulating film and the second and third through holes passing through the electrode insulating film, and the overlying film can be simultaneously formed by patterning having selectivity for the first electrode formed on the overlying film. Thus, when the overlying film is formed between the resin film and the first electrode, there is no need to form a through hole passing through only the overlying film. Therefore, the overlying film can be formed on the resin film without the formation of a through hole in the overlying film.

The overlying film is disposed on the resin film. Thus, an insulating material highly effective in inhibiting image sticking can be used for the electrode insulating film.

A liquid crystal display according to an embodiment of the invention includes a pair of substrates, a liquid crystal layer being held by the pair of substrates, a first electrode and a second electrode that drive the liquid crystal layer, and a driving element that controls the driving of the first electrode, the first electrode, the second electrode, and the driving element being disposed on one of the pair of substrates. The one of the pair of substrates includes a resin film, a reflective film disposed on the resin film, an overlying film covering the reflective film, the first electrode being disposed on the top surface of the overlying film, an electrode insulating film covering the first electrode, the second electrode being disposed on the top surface of the electrode insulating film, a connection electrode disposed on the electrode insulating film and connecting the first electrode to the driving element, and a connection line disposed below the overlying film and connected to the second electrode. The connection electrode is connected to the first electrode through a first through hole passing through the electrode insulating film and is connected to the driving element through a second through hole passing through the overlying film and the electrode insulating film. The second electrode is connected to the connection line through a third through hole passing through the overlying film and the electrode insulating film.

A method according to an embodiment of the invention for producing a liquid crystal display including a pair of substrates, a liquid crystal layer being held by the pair of substrates, a first electrode and a second electrode that drive the liquid crystal layer, and a driving element that controls the driving of the first electrode, the first electrode, the second electrode, and the driving element being disposed on one of the pair of substrates includes forming a connection line on the one of the pair of substrates, the connection line being connected to the second electrode, forming a resin film above the connection line, forming a reflective film on the resin film, forming an overlying film on the resin film in such a manner that the overlying film covers the reflective film, forming the first electrode on the overlying film, forming an electrode insulating film on the overlying film in such a manner that the electrode insulating film covers the first electrode, forming a first through hole, a second through hole, and a third through hole, the first through hole passing through the electrode insulating film, and the second and third through holes passing through the electrode insulating film and the overlying film, and forming a connection electrode and the second electrode, the connection electrode being connected to the first electrode through the first through hole and being connected to the driving element through the second through hole, and the second electrode being connected to the connection line through the third through hole.

In this case, in the same way as described above, the first and second through holes are formed simultaneously with the third through hole used for the connection between the second electrode and the connection line, and the first electrode is connected to the driving element with the connection electrode. Hence, there is no need to form a through hole in the overlying film, thereby inhibiting a significant increase in the complexity of the production process. That is, to connect the connection line with the second electrode, it is necessary to form the third through hole at least passing through the overlying film and the electrode insulating film. The first electrode is connected to the driving element with the connection electrode. Thus, when the overlying film is formed between the resin film and the first electrode, there is no need to form a through hole passing through only the overlying film.

The reflective film is covered with the overlying film to insulate the first electrode from the reflective film. Thus, even if a contact potential is generated between the reflective film and the first electrode, the reflective film is not etched during the formation of the first electrode, thereby improving the yield.

It is preferable that in the liquid crystal display according to an embodiment of the invention, the overlying film has a refractive index lower than that of the first electrode.

In this case, the difference in refractive index between the reflective film and the overlying film is larger than that in the case in which the first electrode is disposed on the reflective film, thereby improving the display quality of a reflective image.

It is preferable that in the liquid crystal display according to an embodiment of the invention, the overlying film is an insulating film having a low oxygen content.

In this case, the overlying film is an insulating film having a low oxygen content, thereby inhibiting damage to the resin film due to an oxygen-containing gas. Furthermore, an insulating material highly effective in inhibiting image sticking can be used for the electrode insulating film.

In the liquid crystal display according to an embodiment of the invention, the overlying film may be composed of silicon nitride.

In this case, the overlying film is composed of silicon nitride, thus effectively inhibiting the penetration of an oxygen-containing gas. Therefore, even when the resin film is composed of an organic oxide, it is possible to inhibit damage to the resin film.

In the liquid crystal display according to an embodiment of the invention, the electrode insulating film may be composed of silicon dioxide.

In this case, the electrode insulating film is composed of silicon dioxide having a small number of electronic defect levels, thereby reducing the storage of charges due to an electric field generated between the first and second electrodes. This suppresses the occurrence of image sticking.

An electronic apparatus according to an embodiment of the invention includes the above-described liquid crystal display.

In this case, in the same way as described above, the overlying film can be formed between the resin film and the first electrode without an increase in the number of steps of forming a through hole, thereby inhibiting a significant increase in the complexity of the production process.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
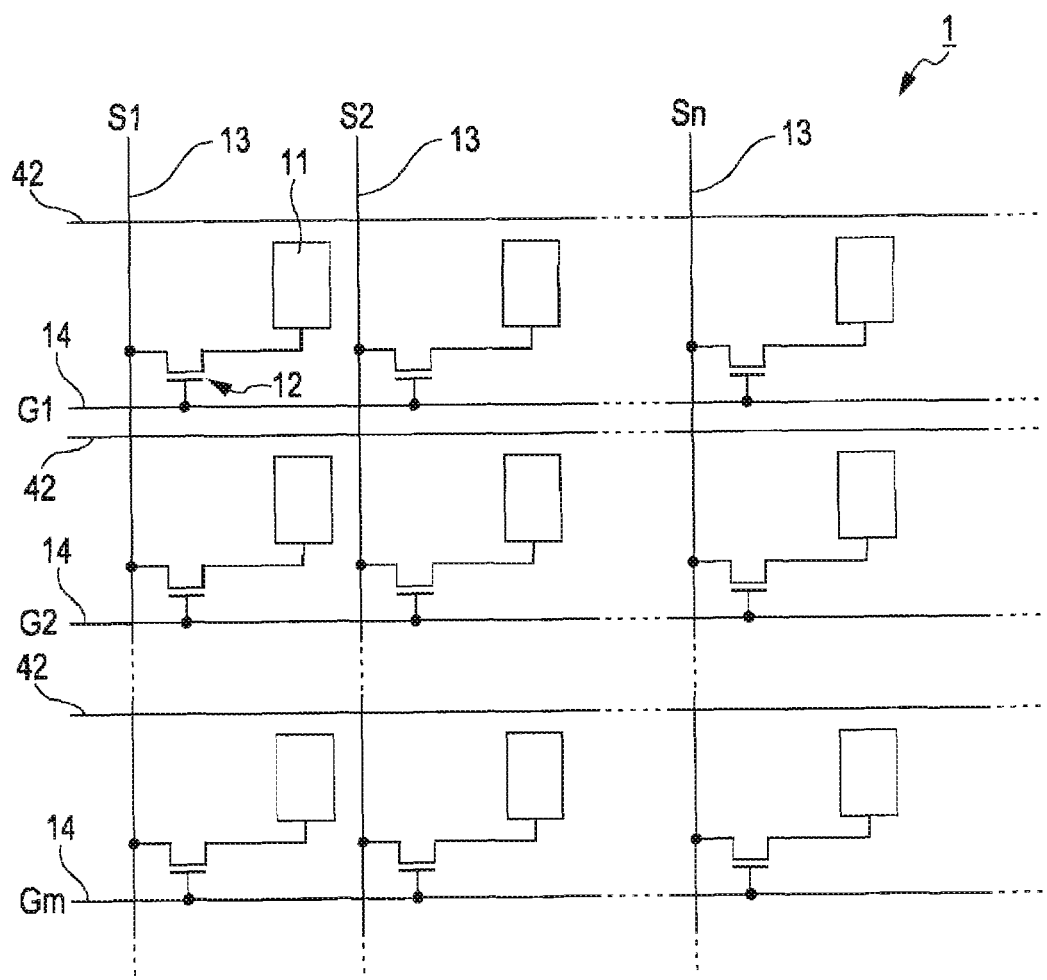
FIG. 1 is an equivalent circuit diagram of a liquid crystal display according to a first embodiment.
Figure 2:
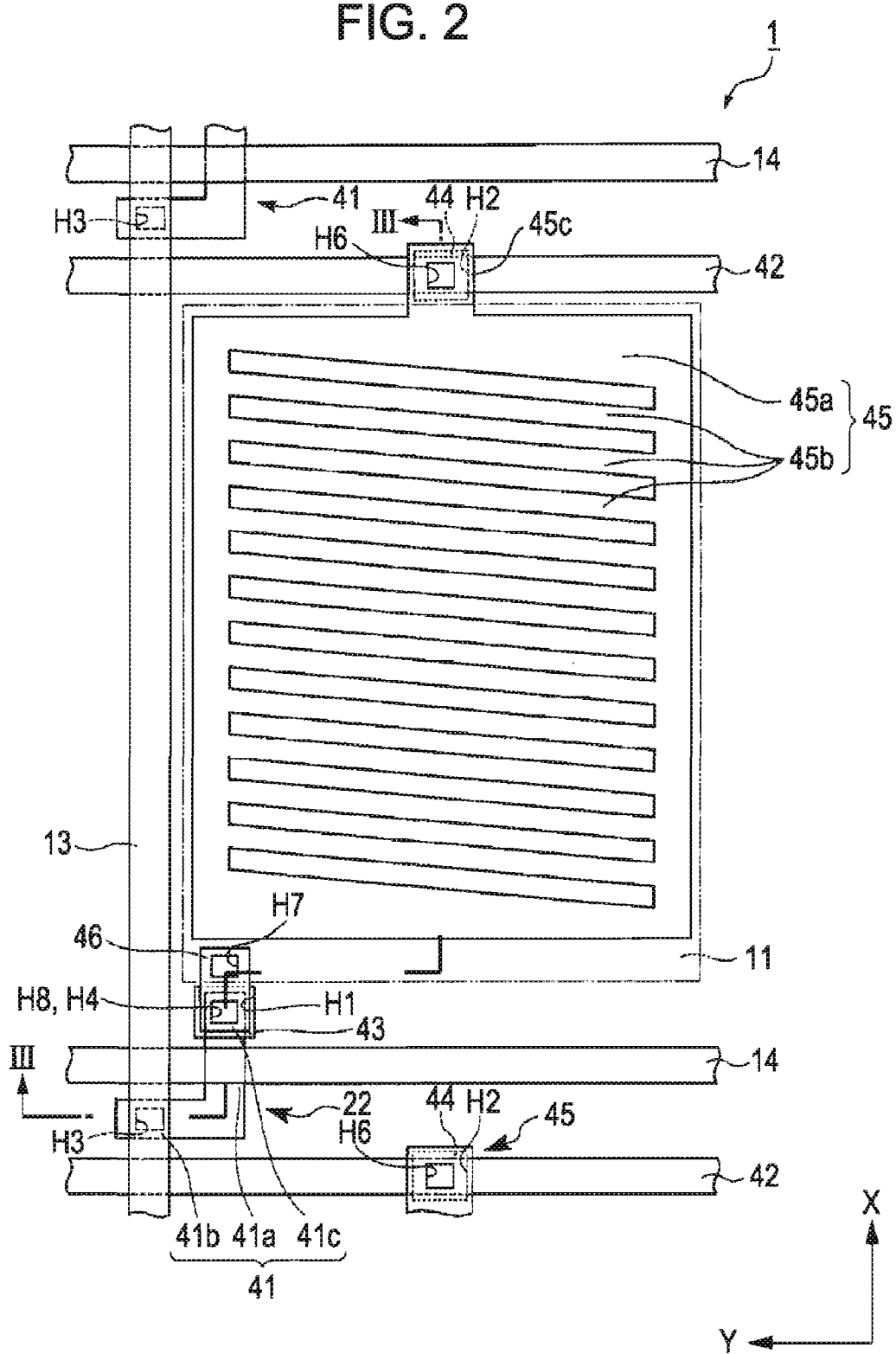
FIG. 2 is a plan view of a sub-pixel region.
Figure 3:
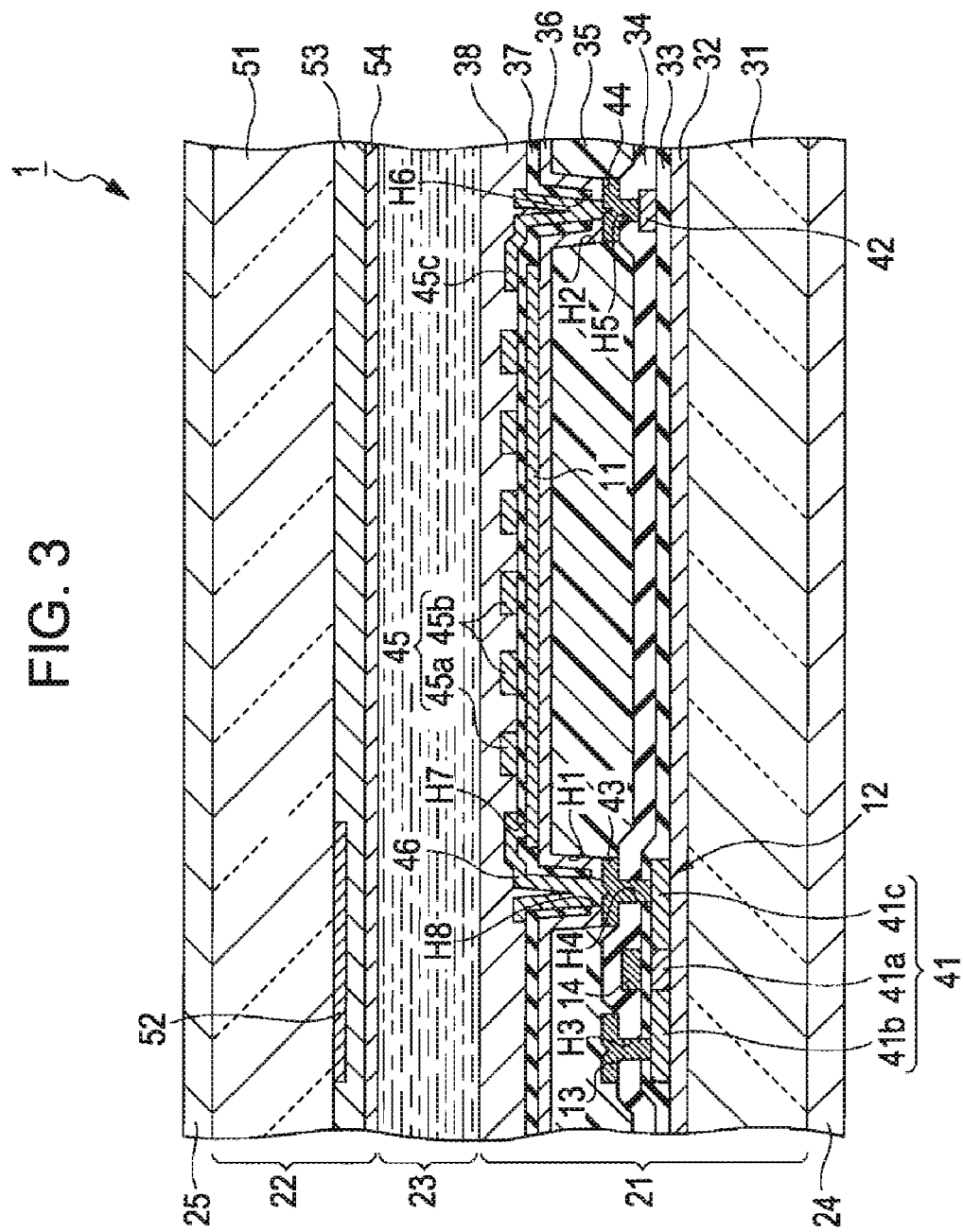
FIG. 3 is a cross-sectional view along arrows III-III in FIG. 2.

A liquid crystal display according to a first embodiment of the invention will be described below with reference to the attached drawings. In the drawings for the description below, components are shown at different scales so as to be recognizable. FIG. 1 is an equivalent circuit diagram of a liquid crystal display. FIG. 2 is a plan view of a sub-pixel region. FIG. 3 is a cross-sectional view along arrows III-III in FIG. 2.

Liquid Crystal Display

A liquid crystal display 1 according to this embodiment is a transmissive color liquid crystal display. In the liquid crystal display 1, three sub-pixel regions that emit light of red (R), green (G) and blue (B) constitute a single pixel. The minimum display region as the smallest display unit is referred to as a "sub-pixel region".

The schematic structure of the liquid crystal display 1 will be described. In the liquid crystal display 1, a plurality of sub-pixel regions constituting an image display area are arrayed in a matrix as shown in FIG. 1.

Each of the plurality of sub-pixel regions includes a pixel electrode (first electrode) 11 and a TFT element (driving element) 12 that performs switching control of the pixel electrode 11. The source of the TFT element 12 is connected to a data line 13 extending from a driving circuit (not shown) disposed on the liquid crystal display 1. The gate of the TFT element 12 is connected to a scanning line 14 extending from a driving circuit (not shown) disposed on the liquid crystal display 1. The drain of the TFT element 12 is connected to the pixel electrode 11.

The data lines 13 feed image signals S1, S2, ..., and Sn from a driving circuit (not shown) disposed on the liquid crystal display 1 to the sub-pixel regions. The data lines 13 may line-sequentially feed the image signals S1 to Sn in that order. Alternatively, the image signals may be fed to each group of a plurality of adjacent data lines 13.

The scanning lines 14 feed scanning signals G1, G2, ..., and Gm from a driving circuit (not shown) disposed on the liquid crystal display 1 to the sub-pixel regions. The scanning lines 14 line-sequentially feed the scanning signals G1 to Gm at predetermined timings in a pulsed manner.

In the liquid crystal display 1, the TFT elements 12, which are switching elements, are in an ON state only for a predetermined period of time by feeding the scanning signals G1 to Gm, and then the image signals S1 to Sn fed from the data lines 13 are applied to the pixel electrodes 11 at predetermined timings. The image signals S1 to Sn applied to the liquid crystal with predetermined levels through the pixel electrodes 11 are maintained between the pixel electrodes 11 and a common electrode 45 for a predetermined period of time.

The structure of the liquid crystal display 1 will be described in detail with reference to FIGS. 2 and 3. In FIG. 2, an opposite substrate 22 is not shown. In FIG. 2, the direction of the long axis of a sub-pixel region having a substantially rectangular shape in plan is defined as the x-axis. The direction of the short axis of the sub-pixel region is defined as the y-axis. In FIG. 2, the number of strips 45b of the common electrode 45 is appropriately changed.

As shown in FIG. 3, the liquid crystal display 1 includes a device substrate (one of a pair of substrates) 21, an opposite substrate (the other substrate) 22 opposing the device substrate 21, a liquid crystal layer 23 disposed between the device substrate 21 and the opposite substrate 22, a polarizer 24 disposed on the outer side of the device substrate 21 (on the side remote from the liquid crystal layer 23), and a polarizer 25 disposed on the outer side of the opposite substrate 22. The liquid crystal display 1 is configured in such a manner that light is incident on the outer side of the device substrate 21.

The liquid crystal display 1 includes a seal (not shown) disposed along the periphery of a region where the device substrate 21 opposes the opposite substrate 22. The liquid crystal layer 23 is sealed with the seal, the device substrate 21, and the opposite substrate 22.

As shown in FIG. 3, the device substrate 21 includes a substrate base 31 composed of a light-transmitting material, such as glass, quartz, or a plastic material, an underlying protective film 32, a gate insulating film 33, an interlayer insulating film 34, a resin film 35, an overlying film 36, an electrode insulating film 37, and an alignment film 38 stacked in that order on the inner side of the substrate base 31 (the surface of the substrate base 31 adjacent to the liquid crystal layer 23).

The device substrate 21 further includes a semiconductor layer 41 disposed on the inner surface of the underlying protective film 32, the scanning line 14 and a common line 42 (connection line) disposed on the inner surface of the gate insulating film 33, the data line 13, a first relay electrode 43, and a second relay electrode 44 disposed on the inner surface of the interlayer insulating film 34, the pixel electrode 11 disposed on the inner surface of the overlying film 36, and common electrode 45 and a connection electrode 46 disposed on the inner surface of the electrode insulating film 37.

The underlying protective film 32 is composed of a light-transmitting silicon oxide such as $SiO_2$ and covers the substrate base 31. The material of the underlying protective film 32 is not limited to $SiO_2$. The underlying protective film 32 may be composed of an insulating material, for example, SiN, SiON (silicon oxynitride), or a ceramic material.

The gate insulating film 33 is composed of a light-transmitting material such as SiO$_2$ and covers the semiconductor layer 41 formed on the underlying protective film 32.

The interlayer insulating film 34 is composed of a light-transmitting material such as SiO$_2$ and covers the gate insulating film 33 and the scanning line 14 and a common line 42 formed on the gate insulating film 33.

The resin film 35 is composed of a photosensitive light-transmitting resin material such as acrylic and covers the interlayer insulating film 34, the data line 13, the first relay electrode 43, and the second relay electrode 44 formed on the interlayer insulating film 34. Through holes H1 and H2 that expose at least part of the first and second relay electrodes 43 and 44 are formed in the resin film 35.

The overlying film 36 is an additional insulating film provided to reduce damage from an oxygen-containing gas to the resin film 35 during film formation. The overlying film 36 has a refractive index smaller than that of the pixel electrode 11.

The electrode insulating film 37 is composed of a light-transmitting material such as SiO$_2$ and covers the pixel electrode 11 formed on the overlying film 36.

The alignment film 38 is composed of a resin material such as polyimide and covers the common electrode 45 and the connection electrode 46 formed on the electrode insulating film 37. The surface of the alignment film 38 is subjected to alignment treatment so as to be aligned in the direction of the short axis (y-axis) of the sub-pixel region shown in FIG. 2.

The semiconductor layer 41 has a substantially L-shape in plan as shown in FIG. 2. The semiconductor layer 41 includes part of a region that overlaps the scanning line 14 in plan with the gate insulating film 33 provided therebetween. The semiconductor layer 41 is composed of a semiconductor material such as polysilicon. The semiconductor layer 41 includes a channel region 41a that overlaps the scanning line 14 in plan with the gate insulating film 33 provided therebetween.

The semiconductor layer 41 also includes a source region 41b and a drain region 41c formed by implanting dopant ions. The TFT element 12 is mainly constituted by the semiconductor layer 41. The channel region 41a is formed by not implanting a dopant ion into the polysilicon film. The semiconductor layer 41 may have a lightly doped drain (LDD) structure in which a heavily doped region having a relatively high dopant concentration and a lightly doped region having a relatively low dopant concentration are formed in each of the source region and the drain region.

Each scanning line 14 is disposed in the direction of the short axis (y-axis) of the sub-pixel, region having a substantially rectangular shape in plan. The scanning line 14 is composed of a metal material such as Al. A portion of the scanning line 14 facing the channel region 41a with the gate insulating film 33 provided therebetween serves as a gate electrode.

Each common line 42 is disposed in the direction of the y-axis in plan and composed of a metal material such as Al.

Each data line 13 is disposed in the direction of the long axis (x-axis) of the sub-pixel region in plan and composed of a metal material such as Al. The data line 13 is connected to the source region 41b of the semiconductor layer 41 through a through hole H3 passing through the gate insulating film 33 and the interlayer insulating film 34. That is, the data line 13 connects the TFT elements 12 arranged in the direction of the x-axis.

The first relay electrode 43 is composed of a metal material such as Al. The first relay electrode 43 is connected to the drain region 41c of the semiconductor layer 41 through a through hole H4 passing through the gate insulating film 33 and the interlayer insulating film 34.

The second relay electrode 44 is composed of a metal material such as Al. The second relay electrode 44 is connected to the common line 42 through a through hole H5 passing through the interlayer insulating film 34.

As shown in FIGS. 2 and 3, the pixel electrode 11 has a substantially rectangular shape in plan and is composed of a light-transmitting conductive material such as indium tin oxide (ITO).

The common electrode 45 has a substantially ladder shape. The common electrode 45 is composed of a light-transmitting conductive material such as ITO as in the pixel electrode 11. The common electrode 45 includes a frame 45a having a substantially rectangular shape in plan and the plurality of strips 45b extending substantially in the direction of the short axis (y-axis) of the sub-pixel region and spaced apart from each other in the direction of the long axis (x-axis) of the sub-pixel region.

The frame 45a has a structure in which two pairs of strip electrodes are connected to each other so as to have a substantially rectangular shape in plan. Two sides opposite to each other extend in the direction of the long axis (x-axis). The other two sides opposite to each other extend in the direction of the short axis (y-axis). The frame 45a has a branched portion 45c that overlaps the common line 42 in plan with the interlayer insulating film 34 and the like provided therebetween. The branched portion 45c is connected to the second relay electrode 44 through a through hole H6 (third through hole) passing through the overlying film 36 and the electrode insulating film 37.

The strips 45b are parallel to each other. Both ends of each strip 45b are connected to portions of the frame 45a extending in the direction of the y-axis. The strips 45b extend so as not to be parallel to the direction of the y-axis. That is, each of the strips 45b extend in such a manner that the distance between each strip 45b and the scanning line 14 decreases at greater distances from the data line 13 in plan.

For example, a predetermined constant voltage used for driving the liquid crystal layer 23, 0 V, or a signal in which a first predetermined constant potential and a second predetermined constant potential different from the first predetermined constant potential are periodically switched (every frame period or field period) is applied to the common electrode 45.

The connection electrode 46 is composed of a light-transmitting conductive material such as ITO in the same way as in the pixel electrode 11 and the common electrode 45. The connection electrode 46 is connected to the pixel electrode 11 through a through hole H7 (first through hole) passing through the electrode insulating film 37. The connection electrode 46 is connected to the first relay electrode 43 through a through hole H8 (second through hole) passing through the overlying film 36 and the electrode insulating film 37. Thus, the pixel electrode 11 is connected to the drain of the TFT element 12.

The liquid crystal display 1 has the above-described structure in which the liquid crystal is driven by an electric field in the planar direction of the substrate (lateral electric field) generated by applying a voltage between the pixel electrode 11 and the strips 45b of the common electrode 45. The pixel electrode 11 and the common electrode 45 constitute an electrode structure of a fringe-field switching (FFS) mode.

As shown in FIG. 3, the opposite substrate 22 includes a substrate base 51 composed of a light-transmitting material such as glass, quartz, or a plastic material, a light-shading film 52, a color filter layer 53, and an alignment film 54 stacked in that order on the inner surface of the substrate base 51 (on the side adjacent to the liquid crystal layer 23).

The light-shading film 52 is disposed in a region located at the periphery of the sub-pixel region in plan on the surface of the substrate base 51, the region overlapping the TFT element 12, the data line 13, and the scanning line 14 with the liquid crystal layer 23 and the like. The light-shading film 52 is in the form of a substantially grid-like pattern in plan. Thus, the light-shading film 52 surrounds the sub-pixel region.

The color filter layer 53 is disposed in response to each sub-pixel region and covers the light-shading film 52. The color filter layer 53 is composed of, for example, acrylic and contains colorants corresponding to colors displayed in the sub-pixel regions.

The alignment film 54 is composed of a light-transmitting resin material such as polyimide and covers the color filter layer 53. The inner surface of the alignment film 54 is subjected to rubbing treatment in the same direction as the alignment direction of the alignment film 54.

Liquid crystal molecules constituting the Liquid crystal layer 23 are horizontally aligned in the direction of the y-axis in an OFF state in which a voltage is not applied between the pixel electrode 11 and the common electrode 45 because the alignment films 38 and 54 are subjected to alignment treatment in the alignment direction along the short axis (y-axis) of the sub-pixel region. The liquid crystal molecules are aligned in the direction orthogonal to the direction in which the strips 45b extend in an ON state in which a voltage is applied between the pixel electrode 11 and the common electrode 45. Thus, the liquid crystal layer 23 provides retardation for light transmitted through the liquid crystal layer 23 by means of birefringence based on the difference in the alignment state of the liquid crystal molecules between the OFF and ON states.

The polarizers 24 and 25 are arranged in such a manner that their polarization axes are substantially orthogonal to each other. An optical compensation film (not shown) may be arranged on the inner side of one or both polarizers 24 and 25. In the case where the optical compensation film is arranged, retardation in the liquid crystal layer 23 when the liquid crystal display 1 is viewed from an angle can be compensated, thereby reducing optical cross-talk to increase contrast. Examples of the optical compensation film include a combination of a negative uniaxial medium and a positive uniaxial medium; and a biaxial medium in which refractive indices in different directions satisfy the relationship nx>nz>ny.

Method for Producing Liquid Crystal Display

A method for producing the liquid crystal display 1 having the structure described above will be described below with reference to FIGS. 4A to 5C. FIGS. 4A to 5C are process drawings illustrating the production process of the liquid crystal display 1. In this embodiment, the production process of the device substrate 21 has advantageous features. Thus, these features are mainly described.

Figure 4A:
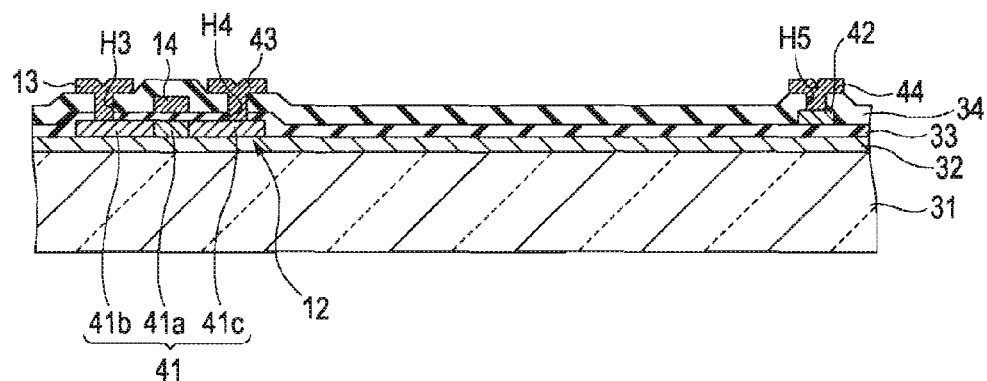
FIGS. 4A to 4C are process drawings illustrating a production process of a liquid crystal display.

The underlying protective film 32 is formed on the top surface of the substrate base 31. The semiconductor layer 41 is formed on the underlying protective film 32. The gate insulating film 33 is formed so as to cover the semiconductor layer 41. The scanning line 14 and the common line 42 are formed on the gate insulating film 33. The interlayer insulating film 34 is formed so as to cover the scanning line 14 and the common line 42. The data line 13 and the first and second relay electrodes 43 and 44 are formed on the interlayer insulating film 34. At this times the through holes H3 to H5 passing through the gate insulating film 33 and the interlayer insulating film 34 are formed (FIG. 4A).

Figure 4B:
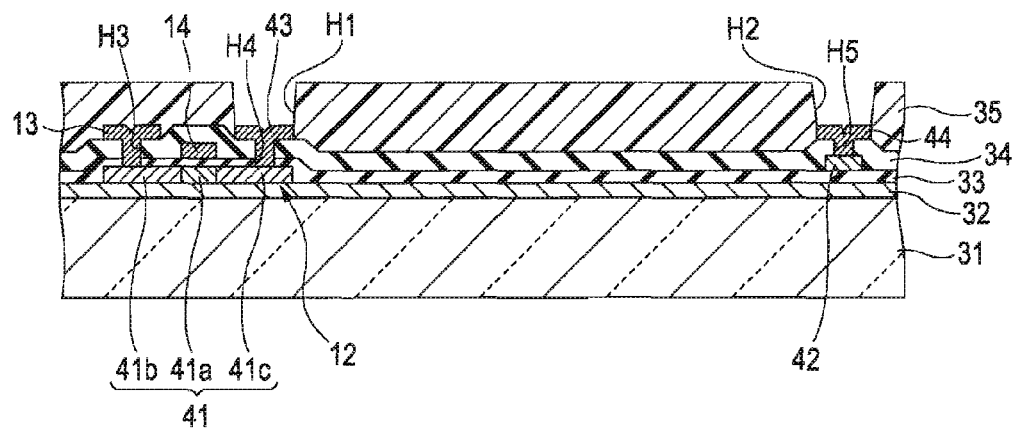

The resin film 35 is formed so as to cover the data line 13 and the first and second relay electrodes 43 and 44. In this case, a resin material constituting the resin film 35 is applied and patterned by photolithography or the like. Thereby, the through holes H1 and H2 that expose at least part of each of the first and second relay electrodes 43 and 44 are formed (FIG. 4B).

Figure 4C:
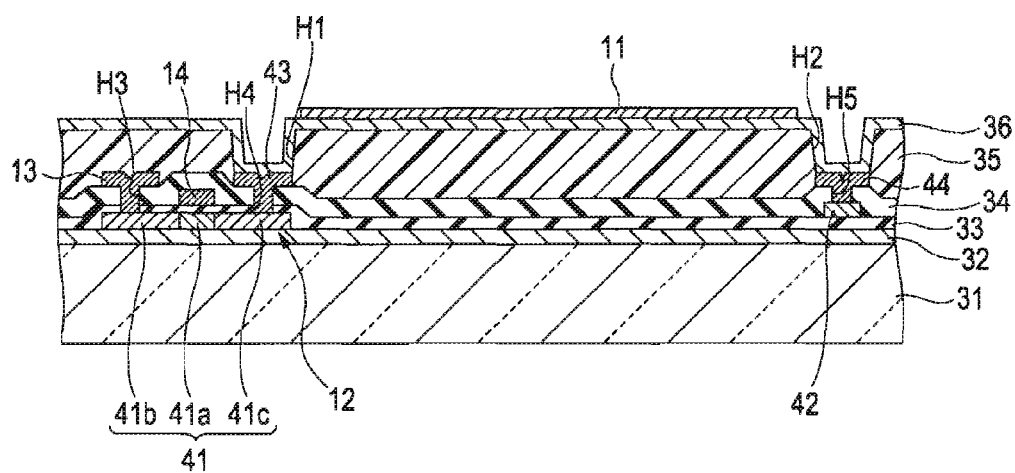

The overlying film 36 is formed on the resin film 35. In this case, a film composed of a light-transmitting material constituting the overlying film 36 is formed on the resin film 35 (FIG. 4C).

The pixel electrode 11 is formed on the overlying film 36. In this case, a film composed of a conductive material constituting the pixel electrode 11 is formed by chemical vapor deposition (CVD) or the like and patterned by photolithography or the like.

Figure 5A:
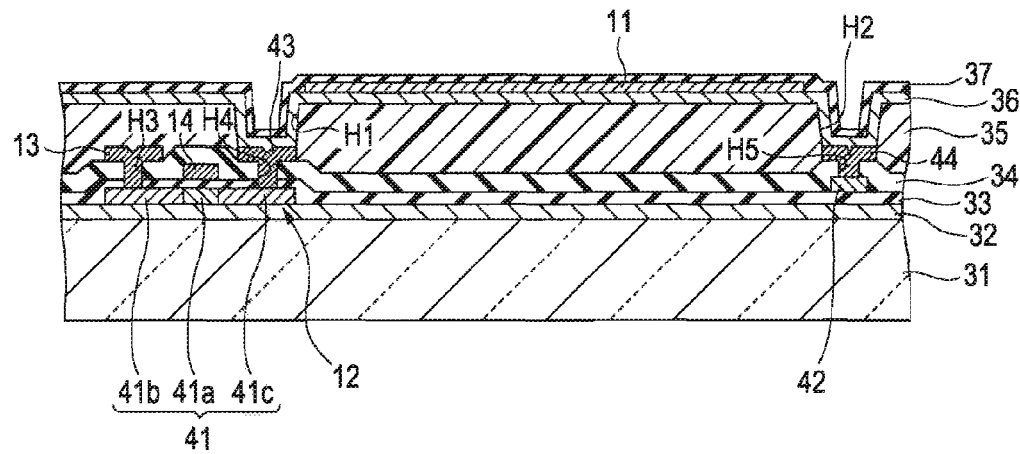
FIGS. 5A to 5C are process drawings illustrating a production process of a liquid crystal display.

The electrode insulating film 37 is formed so as to cover the pixel electrode 11. In this case; a film composed of a light-transmitting material constituting the electrode insulating film 37 is formed (FIG. 5A). The overlying film 36 is disposed on the resin film 35, thereby preventing damage from an oxygen-containing gas to the resin film 35 during the formation of the electrode insulating film 37 by CVD.

Figure 5B:
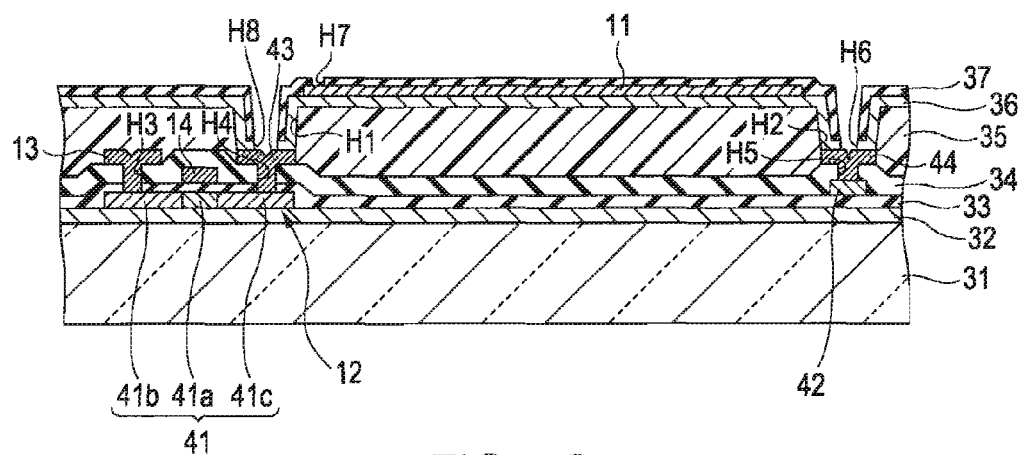

The through hole H7 passing through the electrode insulating film 37 and the through holes H6 and H8 passing through the electrode insulating film 37 and the overlying film 36 are formed. In this case, the through holes H7 and H8 are formed by photolithography or the like. Thereby, the through hole H7 passing through the electrode insulating film 37 is formed simultaneously with the through holes H6 and H8 passing through the electrode insulating film 37 and the overlying film 36 (FIG. 5B). This eliminates the need to separately pattern the overlying film 36 and the electrode insulating film 37.

Figure 5C:
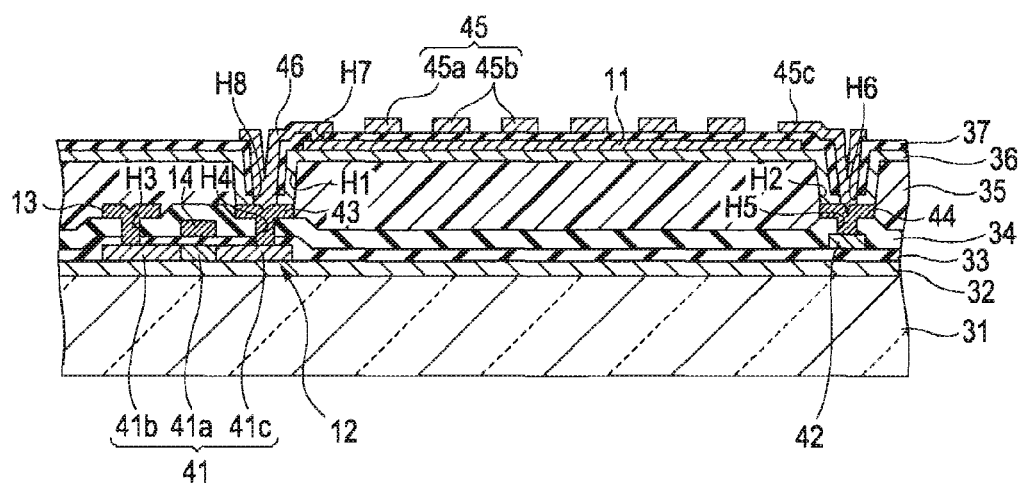

The common electrode 45 and the connection electrode 46 are formed on the electrode insulating film 37. In this case, a film composed of a conductive material constituting the common electrode 45 and the connection electrode 46 is formed by CVD or the like and patterned by photolithography or the like. At this time, the common electrode 45 is connected to the second relay electrode 44 through the through hole H6, and the connection electrode 46 is connected to the first relay electrode 43 through the through holes H7 and H8 (FIG. 5C).

The alignment film 38 is formed so as to cover the common electrode 45 and the connection electrode 46. Thereby, the device substrate 21 is formed.

The device substrate 21 is bonded to the opposite substrate 22 with the above-described seal to form a cavity. A liquid crystal material is charged into the resulting cavity. The cavity filled with the liquid crystal material is sealed to form the liquid crystal layer 23. The polarizers 24 and 25 are formed on the outer surfaces of the device substrate 21 and the opposite substrate 22. Thereby, the liquid crystal display 1 as shown in FIGS. 2 and 3 is produced.

Operation of Liquid Crystal Display

The operation of the liquid crystal display 1 having the structure will be described below. Light incident on the outer surface of the device substrate 21 is converted into linearly polarized light parallel to the direction of the long axis (x-axis shown in FIG. 2) of the sub-pixel region by the polarizer 24 and is then incident on the liquid crystal layer 23.

In an OFF state, the linearly polarized light incident on the liquid crystal layer 23 emerges from the liquid crystal layer 23 in the same polarization state as that when light is incident on the liquid crystal layer 93. The polarization direction of the linearly polarized light is orthogonal to the polarization axis of the polarizer 25; hence, the light is blocked by the polarizer 25. Thus, the sub-pixel region is in a dark display state.

In an ON state, the liquid crystal layer 23 provides predetermined retardation (half-wave retardation) for the linearly polarized light incident on the liquid crystal layer 23. The linearly polarized light is converted into linearly polarized light having a polarization direction orthogonal to that when the linearly polarized light is incident on the liquid crystal layer 23. The resulting linearly polarized light emerges from the liquid crystal layer 23. The polarization direction of the linearly polarized light is parallel to the polarization axis of the polarizer 25; hence, the light is transmitted through the polarizer 25 to be visually recognized. Thus, the sub-pixel region is in a bright display state.

Image signals S1 to Sn that drive the liquid crystal layer 23 are fed through the data line 13 to generate an electric field between the common electrode 45 and the pixel electrode 11 disposed on the device substrate 21. The electrode insulation film 37 composed of $SiO_2$ having a small number of electronic defect levels (traps) is disposed between the pixel electrode 11 and the common electrode 45, thus inhibiting image sticking. The common electrode 45 is disposed closer to the liquid crystal layer 23 than the pixel electrode 11, thus preventing the effect of an electric field generated in one sub-pixel region on peripheries of adjacent sub-pixel regions.

Electronic Apparatus

Figure 6:
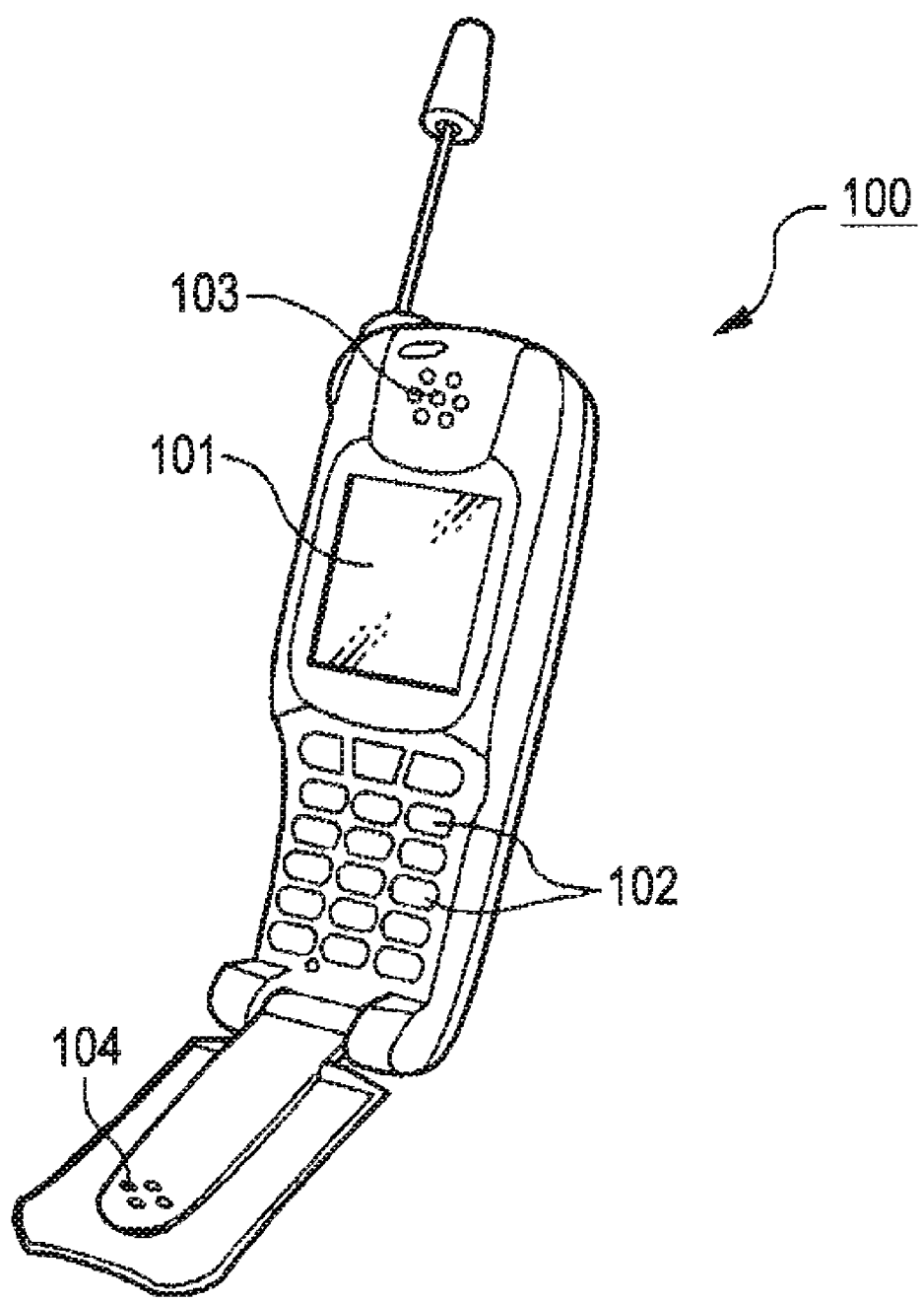
FIG. 6 is a perspective view of a mobile phone including a liquid crystal display.

The liquid crystal display 1 having the structure described above is used as, for example, a display portion 101 of a mobile phone (electronic apparatus) 100 as shown in FIG. 6. The mobile phone 100 includes the display portion 101, a plurality of operation buttons 102, an ear piece 103, a mouthpiece 104, and a main body having the display portion 101.

As has been described above, in accordance with the liquid crystal display 1, the method for producing the liquid crystal display 1, and the mobile phone 100 according to this embodiment, the through hole H6 that connects the common electrode 45 and the common line 42 is formed simultaneously with the formation of the through holes H7 and H8, and the pixel electrode 11 is connected to the TFT element 12 through the connection electrode 46. Thus, there is no need to form a through hole passing through only the overlying film 36. Therefore, the overlying film 36 can be formed on the resin film 35 without a significant increase in the complexity of the production process.

Since the overlying film 36 is disposed on the resin film 35, for example, the electrode insulating film 37 may be composed of, for example, $SiO_2$ that can inhibit the occurrence of image sticking but needs to use an oxygen-containing gas during the formation thereof.

Second Embodiment

Figure 7:
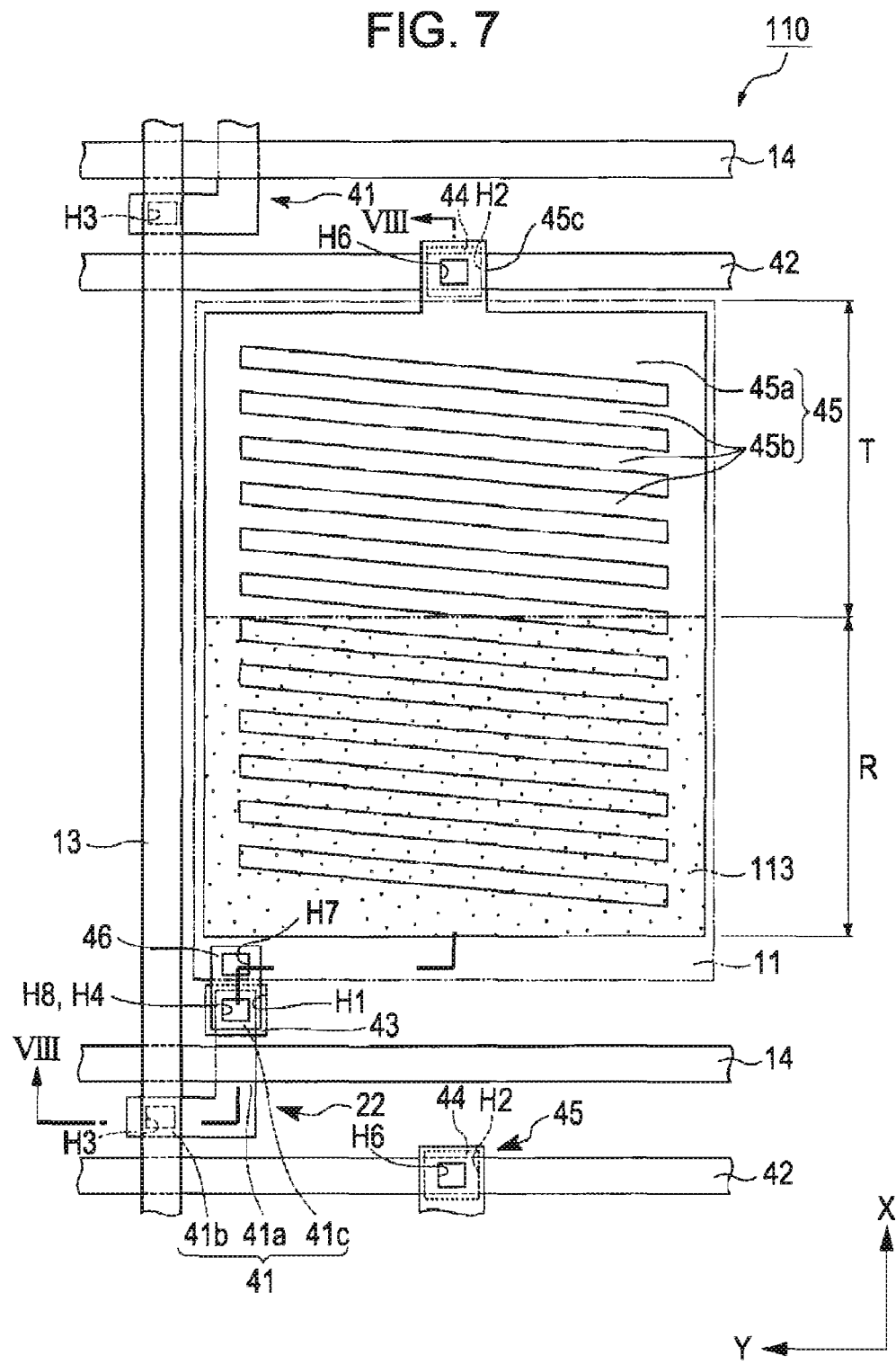
FIG. 7 is a plan view of a sub-pixel region of a liquid crystal display according to a second embodiment.
Figure 8:
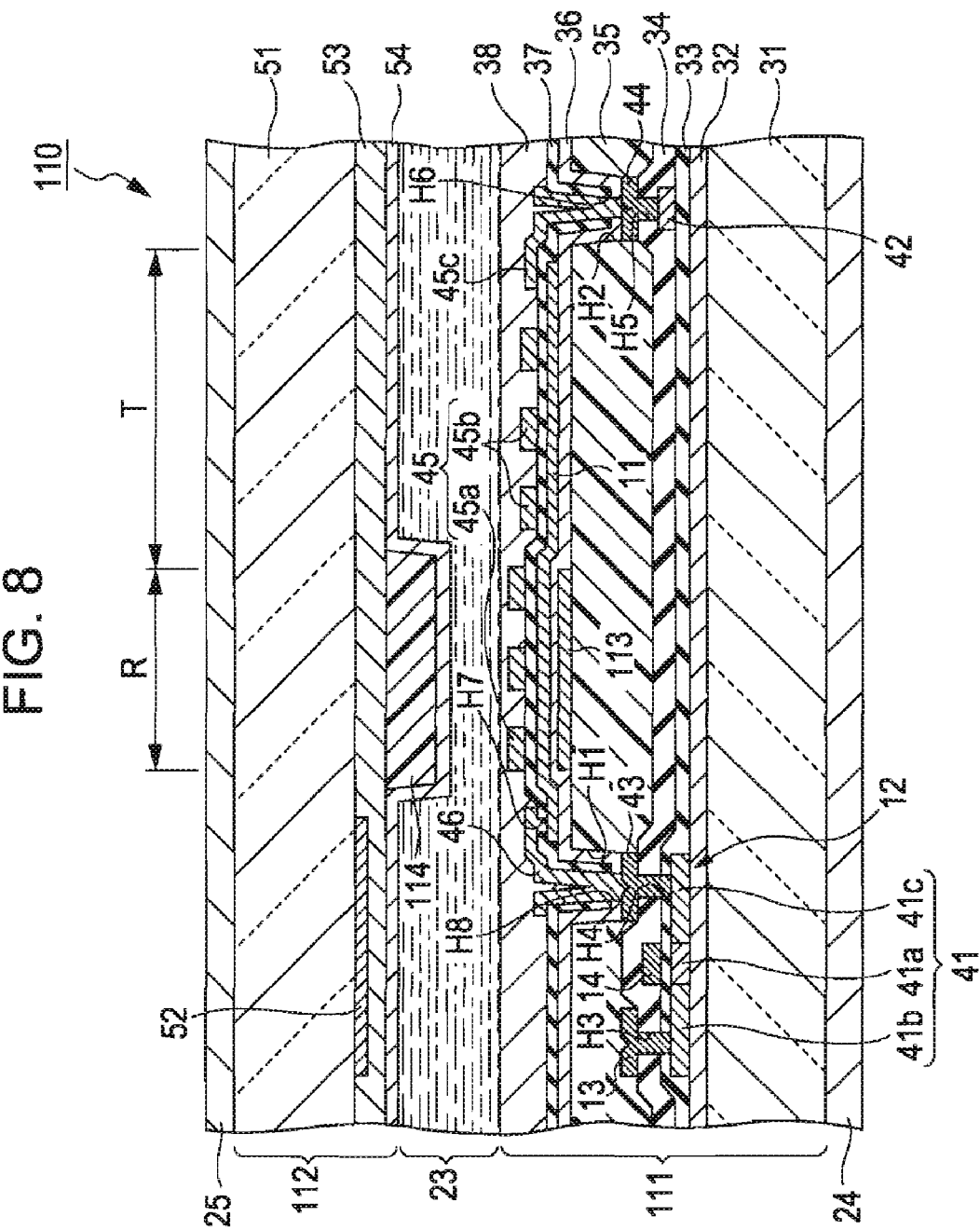
FIG. 8 is a cross-sectional view along arrows VIII-VIII in FIG. 7.

A liquid crystal display and a method for producing a liquid crystal display according to a second embodiment of the invention will be described below with reference to the attached drawings. FIG. 7 is a plan view of a sub-pixel region. FIG. 8 is a cross-sectional view along arrows VIII-VIII in FIG. 7. In this embodiment, the structure of the sub-pixel region is different from that in the first embodiment. Thus, the difference will be mainly described. The components described in the embodiment above are designated using the same reference numerals, and redundant description is not repeated.

Liquid Crystal Display

A liquid crystal display 110 according to this embodiment is a transflective color liquid crystal display including two display areas in a sub-pixel region: a reflective display area R and a transmissive display area T, which are formed by partitioning the sub-pixel region in the direction of the long axis (x-axis), as shown in FIGS. 7 and 8. The liquid crystal display 110 includes a device substrate 111, an opposite substrate 112, and the liquid crystal layer 23.

The device substrate 111 includes a reflective film 113 corresponding to the reflective display area R, the reflective film 113 being disposed on the inner surface of the resin film 35. The reflective film 113 is a metal film composed of, for example, Al having light reflectivity. The reflective film 113 is covered with the overlying film 36, which is an additional insulating film. The overlying film 36 is composed of, for example, SiN.

The opposite substrate 112 includes a liquid-crystal-layer-thickness-controlling layer 114 corresponding to the reflective display area R, the liquid-crystal-layer-thickness-controlling layer 114 being disposed on the inner surface of the color filter layer 53. The liquid-crystal-layer-thickness-controlling layer 114 is composed of a light-transmitting material such as acrylic and covered with the alignment film 54. The liquid-crystal-layer-thickness-controlling layer 114 provides the difference between the thickness of the liquid crystal layer 23 in the reflective display area R and the thickness of the liquid crystal layer 23 in the transmissive display area T. That is, the liquid-crystal-layer-thickness-controlling layer 114 has a function to optimize retardation for light transmitted through the liquid crystal layer 23 in each of the reflective display area R and transmissive display area T.

Method for Producing Liquid Crystal Display

Figure 9A:
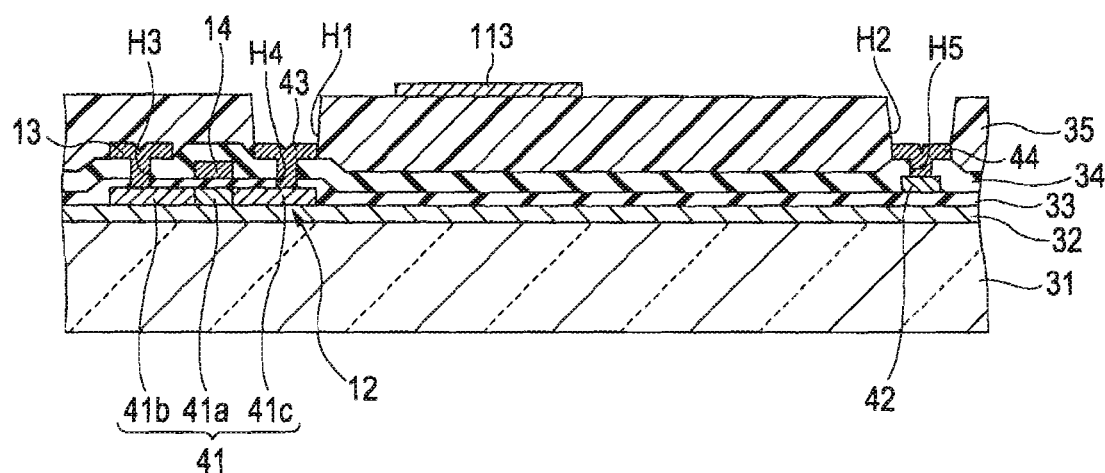
FIGS. 9A and 9B are process drawings illustrating a production process of a liquid crystal display.
Figure 9B:
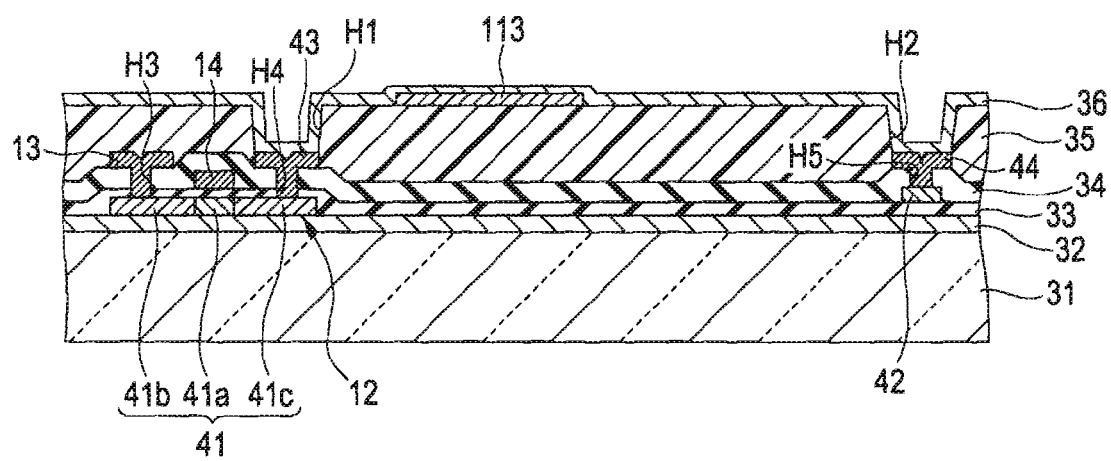

A method for producing the liquid crystal display 110 having the structure described above will be described below with reference to FIGS. 9A and 9B. FIGS. 9A and 9r are process drawings illustrating the production process of the liquid crystal display 110. In this embodiment, the production process of the device substrate 111 has advantageous features. Thus, these features will be mainly described.

In the same way as in the first embodiment described above, the resin film 35 is formed. A metal film constituting the reflective film 113 is formed on the resin film 35 and patterned to form the reflective film 113 (FIG. 9A). The overlying film 36 is formed on the resin film 35 so as to cover the reflective film 113 (FIG. 9B). In the same way as in the first embodiment described above, the pixel electrode 11 and the like are formed to form the device substrate 111. In this case, the reflective film 113 is covered with the overlying film 36 to insulate the reflective film 113 from the pixel electrode 11. Thus, even when a contact potential is generated between the reflective film 113 and the pixel electrode 11, the reflective film 113 is prevented from being etched during patterning (e.g., wet etching) of the pixel electrode 11 using an electrolytic solution.

The device substrate 111 is bonded to the opposite substrate 112 with the above-described seal to form a cavity. A liquid crystal material is charged into the resulting cavity. The cavity filled with the liquid crystal material is sealed to form the liquid crystal layer 23. The polarizers 24 and 25 are formed on the outer surfaces of the device substrate 111 and the opposite substrate 112. Thereby, the liquid crystal display 110 as shown in FIGS. 7 and 8 is produced.

In accordance with the liquid crystal display 110, the method for producing the liquid crystal display 110, and a mobile phone according to this embodiment, the overlying film 36 can be formed on the resin film 35 without a significant increase in the complexity of the production process, as described above.

The reflective film 113 is covered with the overlying film 36 to insulate the reflective film 113 from the pixel electrode 11, thereby inhibiting the etching of the reflective film 113 during patterning of the pixel electrode 11 to improve the yield of the liquid crystal display 110.

The overlying film 36 has a refractive index lower than that of the pixel electrode 11, thereby increasing the difference in refractive index between the reflective film 113 and the overlying film 36 to improve display quality in the reflective display area R.

The invention is not limited to the above-described embodiments. Various changes may be made without departing from the scope of the invention.

For examples the overlying film is composed of SiN. Alternatively, another material may be used as long as can prevent damage from an oxygen containing gas to the resin film.

The electrode insulating film is composed of $SiO_2$. Alternatively, another material may be used as long as it can prevent image sticking.

The common line is disposed on the gate insulating film. Alternatively, the common line may be disposed on another layer as long as it is disposed below the resin film.

In the second embodiment, the overlying film is composed of SiN or the like. However, the material used for the overlying film is not limited to SiN. The liquid-crystal-layer-thickness-controlling layer is disposed on the opposite substrate. Alternatively, the liquid-crystal-layer-thickness-controlling layer may be disposed on the device substrate. The resin film may also serve as the liquid-crystal-layer-thickness-controlling layer.

In the liquid crystal display, the pixel electrode and the common electrode constitute the electrode structure of the fringe-field switching (FFS) mode. Alternatively, another electrode structure employing a lateral electric field mode, such as an in-plane switching (IPS) mode, may be used as long as the pixel electrode and the common electrode are disposed with the electrode insulating film provided therebetween.

The liquid crystal display is not limited to a color liquid crystal display.

The electronic apparatus including the liquid crystal display is not limited to the mobile phone. Other electronic apparatuses may be used. Examples thereof include mobile personal computers, personal digital assistants (PDAs), personal computers, notebook computers, workstations, digital still cameras, monitors for automobile use, car navigation systems, heads-up displays, digital video cameras, television receivers, viewfinder type or direct monitoring type video tape recorders, pagers, electronic notebooks, desktop calculators, electronic books, projectors, word processors, video phones, and POS terminals.

What is claimed is:

1. A liquid crystal display comprising:
   a pair of substrates;
   a liquid crystal layer being held by the pair of substrates;
   a first electrode and a second electrode that drive the liquid crystal layer; and
   a driving element that controls the driving of the first electrode, the first electrode, the second electrode, and the driving element being disposed on one of the pair of substrates, the one of the pair of substrates including:
   a resin film;
   an overlying film disposed on the resin film, the first electrode being disposed on the top surface of the overlying film;
   an electrode insulating film covering the first electrode, the second electrode being disposed on the top surface of the electrode insulating film;
   a connection electrode disposed on the electrode insulating film and connecting the first electrode to the driving element; and
   a connection line disposed below the overlying film and connected to the second electrode,
   wherein the connection electrode is connected to the first electrode through a first through hole passing through the electrode insulating film and is connected to the driving element through a second through hole passing through the overlying film and the electrode insulating film, and
   wherein the second electrode is connected to the connection line through a third through hole passing through the overlying film and the electrode insulating film.

2. The liquid crystal display according to claim 1, wherein the overlying film is an insulating film having a low oxygen content.

3. The liquid crystal display according to claim 1, wherein the overlying film is composed of silicon nitride.

4. The liquid crystal display according to claim 1, wherein the electrode insulating film is composed of silicon dioxide.

5. An electronic apparatus comprising:
   the liquid crystal display according to claim 1.

6. A liquid crystal display comprising:
   a pair of substrates;
   a liquid crystal layer being held by the pair of substrates;
   a first electrode and a second electrode that drive the liquid crystal layer; and
   a driving element that controls the driving of the first electrode, the first electrode, the second electrode, and the driving element being disposed on one of the pair of substrates, the one of the pair of substrates including:
   a resin film;
   a reflective film disposed on the resin film;
   an overlying film covering the reflective film, the first electrode being disposed on the top surface of the overlying film;
   an electrode insulating film covering the first electrode, the second electrode being disposed on the top surface of the electrode insulating film;
   a connection electrode disposed on the electrode insulating film and connecting the first electrode to the driving element; and
   a connection line disposed below the overlying film and connected to the second electrode,
   wherein the connection electrode is connected to the first electrode through a first through hole passing through the electrode insulating film and is connected to the driving element through a second through hole passing through the overlying film and the electrode insulating film, and
   wherein the second electrode is connected to the connection line through a third through hole passing through the overlying film and the electrode insulating film.

7. The liquid crystal display according to claim 6, wherein the overlying film has a refractive index lower than that of the first electrode.

8. The liquid crystal display according to claim 6, wherein the overlying film is an insulating film having a low oxygen content.

9. The liquid crystal display according to claim 6, wherein the overlying film is composed of silicon nitride.

10. The liquid crystal display according to claim 6, wherein the electrode insulating film is composed of silicon dioxide.

11. An electronic apparatus comprising:
   the liquid crystal display according to claim 6.

12. A method for producing a liquid crystal display including a pair of substrates, a liquid crystal layer being held by the pair of substrates, a first electrode and a second electrode that drive the liquid crystal layer, and a driving element that controls the diving of the first electrode, the first electrode, the second electrode, and the diving element being disposed on one of the pair of substrates, the method comprising:
   forming a connection line on the one of the pair of substrates, the connection line being connected to the second electrode;
   forming a resin film above the connection line;
   forming an overlying film on the resin film;
   forming the first electrode on the overlying film;
   forming an electrode insulating film on the overlying film in such a manner that the electrode insulating film covers the first electrode;
   forming a first through hole, a second through hole, and a third through hole, the first through hole passing through the electrode insulating film, and the second and the third through holes passing through the electrode insulating film and the overlying film; and
   forming a connection electrode and the second electrode, the connection electrode being connected to the first electrode through the first through hole and being connected to the driving element through the second through hole, and the second electrode being connected to the connection line through the third through hole.

13. A method for producing a liquid crystal display including a pair of substrates, a liquid crystal layer being held by the pair of substrates, a first electrode and a second electrode that dive the liquid crystal layer, and a driving element that controls the driving of the first electrode, the first electrode, the second electrode, and the driving element being disposed on one of the pair of substrates, the method comprising:
   forming a connection line on the one of the pair of substrates, the connection line being connected to the second electrode;
   forming a resin film above the connection line;
   forming a reflective film on the resin film;
   forming an overlying film on the resin film in such a manner that the overlying film covers the reflective film;
   forming the first electrode on the overlying film;
   forming an electrode insulating film on the overlying film in such a manner that the electrode insulating film covers the first electrode;
   forming a first through hole, a second through hole, and a third through hole, the first through hole passing through the electrode insulating film, and the second and third through holes passing through the electrode insulating film and the overlying film; and
   forming a connection electrode and the second electrode, the connection electrode being connected to the first electrode through the first through hole and being connected to the driving element through the second through hole, and the second electrode being connected to the connection line through the third through hole.

* * * * *